United States Patent Office 2,934,287
Patented Apr. 26, 1960

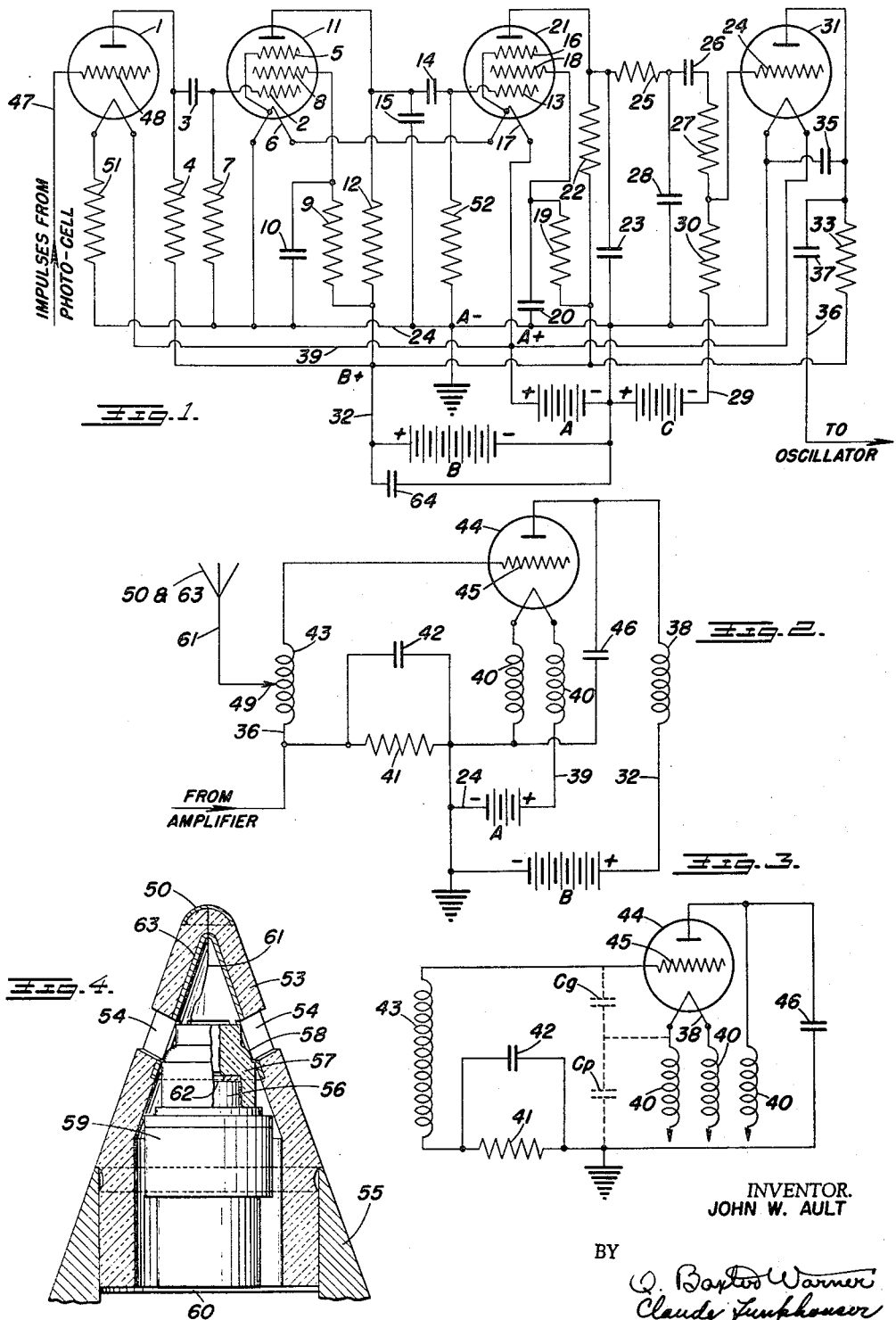

2,934,287

SONDE

John W. Ault, Silver Spring, Md., assignor to the United States of America as represented by the Secretary of the Navy Application March 26, 1946, Serial No. 657,182

4 Claims. (Cl. 244—14)

The present invention relates to sondes and specifically to an arrangement including a wave-signaling circuit used in conjunction with light-responsive and amplifying circuits for providing modulated wave signals, these circuits being installed in a test projectile and the signals being employed in the study of the behavior of proximity fuzes. A representative proximity fuze is disclosed in the co-pending patent application of Joseph E. Henderson et al., Serial No. 568,020, filed in the U.S. Patent Office on December 13, 1944, entitled "Fuze" and assigned to the same assignee as the instant application.

It has been found that the impulses generated by a light-sensitive device, usually a photo-electric cell of the barrier type, also known as a photo-voltaic cell, included in a sonde mounted in the nose of a projectile ordinarily vary in frequency between 20 and 300 cycles per second. These audio signals are amplified and filtered to include only the range of 42 to 65 cycles, which range was found to be the frequency generated upon attainment of proximity to a simulated airplane target and the amplifier should be reasonably responsive through such range of frequencies, without undue distortion. The nose of the projectile has one or more translucent portions to admit light to the cell. Target proximity increases the amplitude of the amplified impulses. In a fuze, such impulses are used for detonating a projectile. In a sonde, they are used to simulate the behavior of a fuze upon attainment of target proximity and under other conditions and to provide a basis for study of such behavior. Specifically, they are used to modulate the output of an oscillator and the modulated signals are received at an observation station. The oscillator usually operates at frequencies ranging between 130 and 160 megacycles per second.

It is an object of the invention to provide an improved arrangement for indicating the behavior of light-sensitive devices through the entire range of frequencies of energy admitted through the windows during the flight of the fuze located or moving at points inaccessible to the observer.

In the accompanying drawings, there is shown a preferred embodiment of a sonde in accordance therewith.

In said drawings:

Fig. 1 is a diagram of the amplifier circuit, included in my improved sonde;

Fig. 2 is a diagram of the oscillator circuit;

Fig. 3 is a diagram showing the relations of the interelectrode capacities to the oscillation circuit components; and Fig. 4 is a fragmentary, partly sectional, view of a sonde in accordance with my invention, as installed in the nose of a projectile.

The amplifier circuit comprises tubes, the first one, 1, being a three-element tube, having a filamentary cathode. The grid circuit of tube 1 is coupled to the output of a photo-voltaic cell. The plate is coupled to the control grid 2 of a pentode tube 11 through a 0.004 mfd. condenser 3. A 0.5 megohm plate resistor 4 is connected to a plate potential source +B. A 2 ohm resistor 51 is inserted in the filament circuit of tube 1. This decreases the over-all sensitivity of the amplifying unit, which is sometimes desirable.

The second tube 11 is a pentode, having its suppressor grid 5 connected to its cathode 6. The control grid 2 is connected to the grounded negative terminal of the A battery through a 5 megohm resistor 7. The screen grid 8 is connected to the positive terminal of the B battery through a 5 megohm resistor 9, and is by-passed to ground for alternating currents by a 0.01 mfd. condenser 10. The plate of tube 11 is coupled to the grid 13 of a third tube 21 by a 1 megohm plate resistor 12 and a .004 mfd. condenser 14. A by-pass condenser 15 of 0.004 mfd. capacity connects the plate 11 to ground.

The third tube is also a pentode with its suppressor 16 connected to its cathode 17. The filaments 6 and 17 of tubes 11 and 21 are connected in series across the A battery. The control grid 13 is connected to the A— terminal or ground through a 5 megohm resistor 52. The screen grid 18 of tube 21 is connected to the B+ terminal through a 5 megohm resistor 19 and is by-passed to the A— lead through a 0.01 mfd. condenser 20. The plate of tube 21 is connected to the B+ lead through a 1.0 megohm plate resistor 22, which is by-passed to the A— terminal through a .01 mfd. condenser 23. Also, the plate of tube 21 is coupled to the grid 24 of a tube 31 through a 200,000 ohm resistor 25, in series with a 0.01 mfd. condenser 26, and a 1 megohm resistor 27, a second condenser 28, also 0.01 mfd., connecting the remote end of resistor 25 to the A— terminal or ground.

The fourth and last tube 31 is a triode. Its grid 24 is connected to a C— terminal 29 through a 50,000 ohm resistor 30. The plate is coupled to the B+ terminal 32 through a 14,500 ±500 ohm resistor 33, and is by-passed to ground through a 0.04 mfd. condenser 35. The amplifier signal output circuit includes coupling condenser 37, 0.012 mfd. and lead 36. Resistors 27 and 30, connected in series, act as a voltage divider, so that only about $\frac{1}{21}$ of the output signal voltage of the tube 21 is applied to the input of tube 31. Otherwise the output would be too high, and would produce distortion in the output of the oscillator tube 44 (Fig. 2) at the "peaked" frequency of the amplifier circuit, i.e., 42–65 cycles.

The oscillation generating circuit illustrated in Fig. 2 includes a triode 44. Its filamentary cathode is connected between the grounded A— lead 24 and the A+ lead 39 (Figs. 1 and 2). One of radio-frequency chokes 40, 40 is interposed in each filament lead, to prevent any alternating current impulses from entering the oscillator by way of the battery circuit.

A relatively large condenser 64 (Fig. 1) is connected in parallel with the B— battery, to prevent self-oscillation. A 0.9 mfd. condenser has been found suitable.

The oscillator plate circuit includes a radio-frequency choke 38 connected to source +B. The grid resistor 41 has a value of 51,000 ohms and is bridged by a grid condenser 42 of 50 mmf. capacity. It has been found that a nominal 100,000 ohm resistor used as 41 gave a good response, but unduly accentuated the higher audio frequencies giving a very bad RC constant causing the oscillation circuit to superregenerate. The considerably lower magnitude of 51,000 ohms is preferred as a suitable value for this grid resistor at the audio frequencies mentioned above.

The tank circuit inductance 43 consists of a coil, having 4 turns of No. 20 wire wound with a pitch of 16 turns per inch on a polystyrene form, ⅝ inch in diameter. The oscillator is of the Colpitts type, and involves a coil and two capacitances.

The necessary capacitances are provided by the interelectrode capacitances of tube 44, as shown in Fig. 3.

Here the cathode-grid capacitance $C_g$ is indicated in dotted lines as bridged across the filament and the grid end of the coil 43, while the cathode-plate capacitance $C_p$ is similarly bridged across the filament and the plate end of the coil.

The coil 43 essentially is connected from the plate of tube 44 to grid 45, with a 500 mmf. blocking condenser 46 interposed, to prevent short circuiting the direct current and audio frequency current components. This value of 500 mmf. for the condenser capacity is large enough to offer but trifling impedance to the ultra-high frequency output of the oscillator, while effectively blocking any D.C. and undesired audio-frequency impulses.

The frequency of the U.H.F. carrier waves produced by the circuit is determined by its electrical constants, and since the interelectrode capacitances of tube 45 are fixed, the only practicable expedient for changing the frequency is to vary the inductance of the coil 43 and the leads connected thereto.

An antenna 63 is tapped off at a suitable point 49 along coil 43.

The output signal of the photo-voltaic cell, which signal is amplified and used to modulate the U.H.F. carrier signal output of the oscillator, is fed to the input circuit of tube 1 through the input lead 47 and ground. The impulses received from the photo-cell, due to intermittent or varying illumination, are amplified by the circuit shown in Fig. 1 and the resultant amplified signal is applied to the circuit shown in Fig. 2 to modulate the output of the oscillator.

A photo-cell 56 of the photo-voltaic type, is mounted as shown in Fig. 4. In this illustration, 53 indicates the nose of a projectile 55. The nose is made hollow to accommodate the amplifier, oscillator, and photo-cell, the amplifier and oscillator being housed in a shielding enclosure 59, and has a base 60.

Openings such as 54, usually four in number (two shown), spaced 90° apart, preferably entirely unobstructed (but which may be closed by translucent material if desired) are provided in the nose, at the proper level to admit light to a lens 58 forming part of a "Lucite" cap 57, which fits over the photo-cell 56 and serves to concentrate such light on the central portion 62 of the said cell, so that the light strikes its sensitive surface.

The antenna comprises here a metal reinforcement 63 molded into the nose, and a cap 50 at the tip of the nose 53, both being connected by a wire 61 to the oscillator within container 59 (specifically to tap 49 on coil 43). The windows 54 are located within the reinforced portion, so that ample strength remains. This antenna radiates the signals transmitted by the sonde.

The operation of my improved sonde is as follows:

When a projectile equipped with a sonde is fired, a spin is imparted thereto and light enters the openings 54 from all lateral directions in turn, so that if, for example, the shell is spinning at 100 revolutions per second, and there are four holes 54, the relatively strong light from the sky strikes the photo-cell 400 times per second, producing 400 maxima of illumination and an equal number of minima.

Since each such photo-cell output pulse produces one cycle of the alternating current component of the output of tube 1, a 400 cycle signal appears at the output of the amplifier, and the high-frequency carrier signals radiated from the antenna are modulated at an audio frequency of 400 cycles per second.

The intensity of the light received by and signals generated by the cell varies with the surroundings of the projectile, so that upon approach to a bright metallic surface in sunlight, for instance, a strong signal is produced by the light-sensitive cell, with a correspondingly strong modulation of the high-frequency radiation from the device.

The modulated wave-signals radiated from the sonde are received at an observation station and studied, with a view to increasing scientific knowledge of the factors influencing the behavior of proximity fuzes.

While specific parameters are herein furnished for purposes of illustration, it will be apparent to those skilled in the art that these are not to be deemed limitations and that various changes and modifications may be made without departing from the teachings of this invention. It is accordingly intended, in the appended claims, to cover all such changes and modifications in the embodiment illustrated as fall within the true scope of the invention and beyond the scope of the prior art.

I claim:

1. In a sonde of the type adapted to be installed in a spinning missile having light-admitting windows, means responsive to varying conditions of light entering the windows for generating modulation impulses having a rate which is a function of the rate of rotation of the missile and an amplitude indicative of said conditions, said means including a photoelectric cell behind the windows, and oscillator means having a modulation input circuit coupled to the first-named means for transmitting radiant-energy signals, said signals being modulated by the impulses, whereby said sonde radiates wave signals having a characteristic indicative of light conditions encountered in flight by the missile.

2. A sonde including, in combination with a missile having a series of light admitting windows, a photoelectric cell in the missile and positioned to receive light of varying intensity from the sky through the windows, said missile being rotatable at a predetermined rate, light from the sky reaching the photoelectric cell causing said cell to produce impulses of electromagnetic energy at a rate which is a function of the rate of rotation of the missile, a modulator connected to said cell, and an oscillator connected to the modulator and operable for transmitting to a remote point signals having a characteristic indicative of light conditions encountered in flight by the missile.

3. A sonde according to claim 2, including an antenna mounted within the missile.

4. A sonde according to claim 2, wherein said missile is provided with an ogive having the light admitting windows therein, and an antenna mounted within the ogive.

References Cited in the file of this patent

UNITED STATES PATENTS

| | | |
|---|---|---|
| 1,936,400 | Langmuir | Nov. 21, 1933 |
| 2,255,245 | Ferrel | Sept. 9, 1941 |
| 2,390,739 | Scherbatskoy | Dec. 11, 1945 |

OTHER REFERENCES

"An Improved Radio Sonde and Its Performance," by Harry Diamond, Wilbur S. Hinman, Jr., Francis W. Dunmore, and Evan G. Lapham; part of Journal of Research of the National Bureau of Standards, volume 25, September 1940, pp. 327 to 367.